US012791023B1

(12) United States Patent
Littleton et al.

(10) Patent No.: US 12,791,023 B1

(45) Date of Patent: Nov. 10, 2026

(54) FRAMELESS MOTOR SCROLL COMPRESSOR

(71) Applicants: Nicholas Glen Littleton, Sherwood, OR (US); Gregory William Bissell, Gilroy, CA (US); David Eric Berkstresser, Los Gatos, CA (US)

(72) Inventors: Nicholas Glen Littleton, Sherwood, OR (US); Gregory William Bissell, Gilroy, CA (US); David Eric Berkstresser, Los Gatos, CA (US)

(73) Assignee: Microrefrigeration, Inc., Wilmington, DE (US)

( * ) Notice: Subject to any disclaimer, the term of this patent is extended or adjusted under 35 U.S.C. 154(b) by 0 days.

(21) Appl. No.: 19/204,232

(22) Filed: May 9, 2025

(51) Int. Cl.

| | |
|---|---|
| ***F04C 18/02*** | (2006.01) |
| ***F04C 29/00*** | (2006.01) |
| ***F04C 29/12*** | (2006.01) |
| ***H02K 1/18*** | (2006.01) |
| ***H02K 1/28*** | (2006.01) |
| ***H02K 7/00*** | (2006.01) |

(52) U.S. Cl.

CPC ...... *F04C 18/0215* (2013.01); *F04C 18/0253* (2013.01); *F04C 29/0021* (2013.01); *F04C 29/0057* (2013.01); *F04C 29/0085* (2013.01); *F04C 29/12* (2013.01); *H02K 1/18* (2013.01); *H02K 1/28* (2013.01); *H02K 7/003* (2013.01); *F04C 2240/30* (2013.01); *F04C 2240/40* (2013.01)

(58) Field of Classification Search

CPC .............. F04C 18/0215; F04C 18/0253; F04C 29/0021; F04C 29/0057; F04C 29/0085; F04C 29/12; F04C 2240/30; F04C 2240/40; H02K 1/18; H02K 1/28; H02K 7/003

USPC ......... 418/55.1, 55.3, 55.5; 417/410.3, 410.4

See application file for complete search history.

(56) References Cited

U.S. PATENT DOCUMENTS

| | | | | |
|---|---|---|---|---|
| 2,761,987 | A * | 9/1956 | Beckwith | H02K 1/185 310/216.118 |
| 7,026,737 | B2 * | 4/2006 | Angerer | H02K 1/27 310/67 R |
| 7,056,104 | B2 * | 6/2006 | Kimura | H02K 5/225 310/85 |
| 8,974,197 | B2 * | 3/2015 | VanBritson | F04C 29/06 417/410.5 |
| 9,071,096 | B2 * | 6/2015 | Allen | H02K 1/185 |
| 2009/0068048 | A1 * | 3/2009 | Stover | F04C 18/0215 418/142 |
| 2009/0297381 | A1 * | 12/2009 | Hwang | F01C 17/066 418/55.3 |
| 2012/0177523 | A1 * | 7/2012 | Won | F04C 27/008 418/55.5 |
| 2018/0223823 | A1 * | 8/2018 | Ignatiev | F04C 29/128 |

* cited by examiner

*Primary Examiner* — Charles G Freay

(74) *Attorney, Agent, or Firm* — Cozen O'Connor

(57) ABSTRACT

A frameless motor scroll compressor, wherein the scroll compressor assembly is located within the interior of a frameless motor, where a stationary scroll provides a scroll interface to a nutating scroll and is fastened or machined into a mounting platform for the frameless motor and other associated hardware that controls the nutating scroll and the rotor of the frameless motor, such that a flat and/or hockey puck shaped compressor is achieved.

18 Claims, 3 Drawing Sheets

FRAMELESS MOTOR SCROLL COMPRESSOR

BACKGROUND OF THE INVENTION

1. Field of the Invention

The present invention relates to a compressor and, more particularly, to a compressor having a mechanical orientation of a scroll compressor assembly located in the internal area of a frameless motor.

2. Description of the Related Art

It is known that compressors are used to compress refrigerant and other gases to enable a cooling process or to enable the use of a compressed gas to perform various functions. Compressors are commonly made in several configurations to include rotary, piston, Wankel, screw, scroll and others. A common type of compressor used in refrigeration and air compression is a scroll compressor. These compressors have two scroll plates, where one plate is stationary and another plate is dynamic. This dynamic scroll or orbit scroll will nutate inside the stationary scroll and build pressure of a refrigerant or gas by continuously closing the radial area of the scrolls to a center section of the assembly where a high-pressure region is created. Nutation refers to the oscillatory movement of the axis of rotation of a spinning body, which can be observed in devices, such as gyroscopes or other rotating mechanisms Scroll compressors are used when high efficiency and low vibration operation are desired. Scroll compressors can also operate as a vacuum pump when rotated in the opposite direction to compression.

It is known that the head units of scroll compressors are assembled to an electric motor. These motors can be DC or AC and these motors have various sizes and horsepower ratings. Scroll compressors head units are attached to the ends of these motors and the assembly provides the function of compression of refrigerant or gas. These assemblies are structured such that the shape of the finished compressor is tubular in nature, and for refrigeration applications is enclosed in a hermetic case. These assemblies range in physical size per application, from something that could fit in the palm of a human hand to something several inches in diameter and roughly 3 times that in length.

It is known that there are frameless motors common in industry. These frameless motors are also referred to as hollow shaft motors or torque motors. These motors are becoming more popular with the advances made in robot technology in that they are often used in orbital joint type connections. These motors are not encased in a housing and the stator and rotor of the motor appear as an open ring. Unlike traditional motors that have a solid center shaft, frameless motors do not have a shaft in the middle that drives a head unit. Frameless motors are designed to have interconnection to apparatus by mechanically connecting the outer stator to an object and to have the inner rotor connect to an object, where these two objects can rotate relative to each other through operation of the motor.

SUMMARY OF THE INVENTION

Disclosed is a frameless motor scroll compressor, where a scroll compressor assembly is located within the interior area of a frameless motor. A fixed or stationary scroll has the purpose of providing a scroll interface to a nutating scroll and is fastened or machined into a mounting platform for the frameless motor and other associated hardware that controls the nutating scroll and the rotor of the frameless motor.

The fixed or stationary scroll also has an exhaust port that exits in the center of the scroll and can be channeled to a side of the compressor where this would engage with associated plumbing to manage a high-pressure refrigerant or gas exiting the compressor.

The dynamic or nutating scroll nests inside the fixed or stationary scroll. The nutating action of this dynamic scroll or orbit scroll is induced by a rotating scroll axis center shaft that has an non centric feature at one end. This non centric feature coupled with the rotation of the shaft enables the nutation motion of the dynamic scroll or orbit scroll. The dynamic scroll or orbit scroll that is nutating is controlled by an Oldham coupling in which the exterior control surfaces of the Oldham coupling are machined into a scroll carrier plate. This scroll carrier plate is attached to the fixed or stationary scroll and thus forms the mechanical containment of the scroll assembly. The Oldham coupling is centered with the scroll axis center shaft that is controlled in rotation via a ball bearing or a solid bearing. There are two areas of bearing control on the scroll axis center shaft. One at the interface of the scroll axis center shaft to the nutating coupling and another at the scroll axis center shaft and the upper frameless rotor area. The Oldham coupling and scroll assembly is out of balance in rotation by design due to nutation motion. The scroll axis center shaft has a counterweight attached close to the dynamic scroll or orbit scroll to ensure low vibration during operation.

An Oldham coupling is a type of mechanical coupling that can be used to connect shafts that are misaligned. An Oldham coupling typically consists of three main parts: two hubs and a center disk.

In the context of the present disclosure, nutation refers to the oscillatory movement of the axis of rotation of a spinning body, which can be observed in devices, such as gyroscopes or other rotating mechanisms. Thus, the dynamic scroll or orbit scroll does not spin, but instead oscillates around the inside of the other scroll, which creates an ever smaller area between the nutating and fixed or stationary scrolls.

The pressure at the latitudinal interface of the fixed or stationary scroll and the dynamic scroll or orbit scroll is critical. With too little pressure a significant "blow-by" of the refrigerant or gas occurs and the compression is compromised. If the pressure is too high, then the scrolls grind against each other and cause the motor to work too hard to rotate, which causes high power consumption. To optimize the latitudinal interface pressure, a wave washer is inserted on the scroll axis center shaft. This wave washer, when torqued correctly in conjunction with the scroll axis center shaft, ensures the correct latitudinal force to the scroll interface that optimized the seal of the scroll interface and the resistance to rotation.

The scroll axis center shaft extends into the center area of the frameless motor. The scroll axis center shaft has additional bearing applications in this region to ensure an aligned and precise spin. These bearings can be ball bearings or solid one or two piece bearings. The spin or rotation of the scroll axis center shaft is induced by the frameless motor rotor. The rotor is the interior part of the frameless motor that is rotating via the motor action of the stator, which is the exterior and fixed part of the frameless motor. To ensure the scroll axis center shaft is mechanically connected to the rotor of the frameless motor, a rotor mount is used to couple the scroll axis center shaft and the rotor of the frameless motor. This rotor mount has the ability to deform when tightened to secure the scroll axis center shaft to the rotor mount. The frameless motor rotor is nested on to the rotor mount with a clamp. By tightening this bolt, the rotor mount will secure the scroll axis center shaft to the frameless motor rotor and thus the ability to spin or rotate the scroll assembly. The bearing interfaces with the scroll axis center shaft and the scroll carrier plate ensure perfect alignment with the frameless motor, the Oldham coupling and the scroll assembly.

With the frameless motor rotor attached to the scroll axis center shaft and aligned inside the frameless motor stator, the stator is then secured in the assembly by nesting on the scroll carrier plate. The stator is clamped down to the scroll carrier plate via a motor clamp ring that attaches the top outer diameter of the stator. It is held in place with bolts and secures the entire assembly.

The assembly of the scrolls, Oldham coupling to the frameless motor and other associated parts must be hermetically sealed to ensure refrigerant does not escape. This hermetic sealing is also needed for compression and to use the assembly as a vacuum pump. A cover is used to enclose the assembly and attach to the scroll carrier plate via an O-ring seal or other type hermetic seal. It is also possible to fabricate an intake port in the side of the cover or this port can be machined into the scroll carrier plate. The refrigerant or other compressed gas travels through the internal sections of the compressor to reach the intake area of the dynamic scroll or orbit scroll. In the case of refrigerant compression, this allows for oiling of the rotating and nutating parts in the compressor and is common in refrigerant compressors.

The frameless motor requires electrical connection to a motor driver to ensure operation. This connection requires a hermetic feedthrough of a wire harness, where this feedthrough is provided in the cover.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Various embodiments are disclosed in the following detailed description and the accompanying drawings, in which.

DETAILED DESCRIPTION OF THE EXEMPLARY EMBODIMENTS

The following detailed description of specific embodiments of the inventive subject matter will be better understood when read in conjunction with the appended drawings. As used herein, an element or step recited in the singular and proceeded with the word "a" or "an" should be understood as not excluding plural of said element or step, unless such exclusion is explicitly stated. Furthermore, references to "embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 2A:
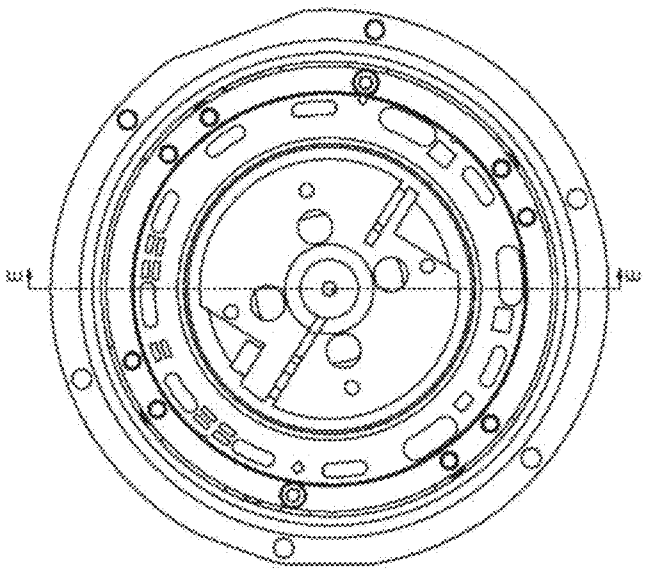
FIG. 2A is a top cross-sectional plan view of the compressor in accordance with the invention.
Figure 1A:
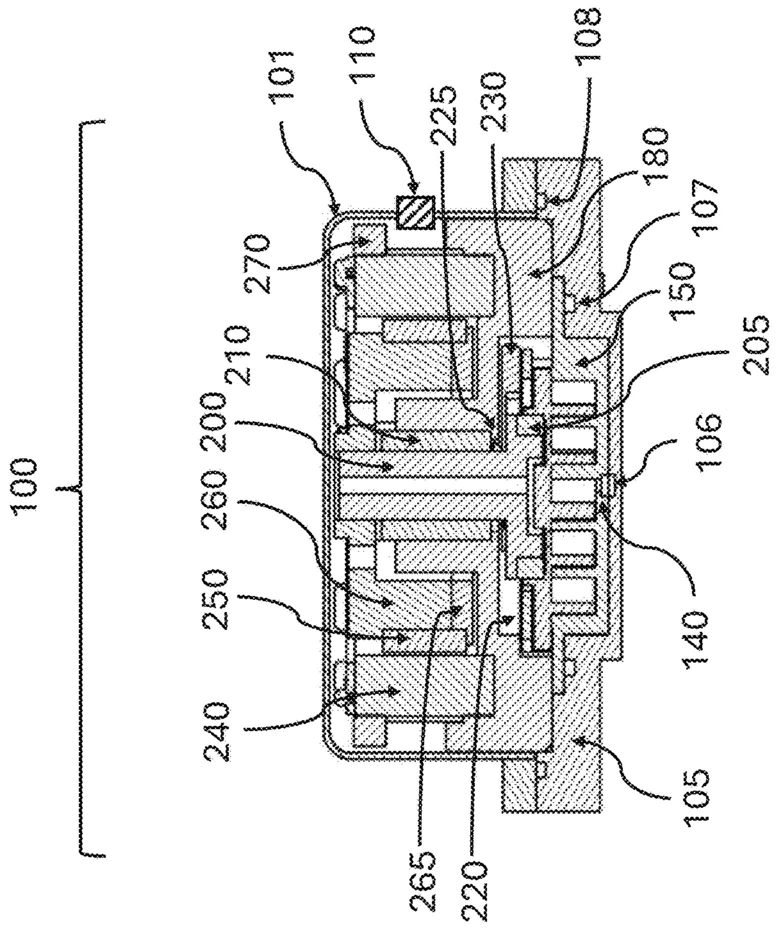
FIG. 1A is a cross sectional view of the compressor in accordance with the invention.

FIG. 1A is a cross sectional view of the frameless motor scroll compressor 100. A frameless motor scroll compressor 100 can compress both air, refrigerant and any other gases common in industry. Illustrated in FIG. 1A is an enclosure 101 that is bolted to a fixed scroll carrier plate 105. The enclosure 101 and the fixed scroll carrier plate 105 are sealed via an O-ring. The fixed scroll carrier plate 105 has an O-ring groove 108 to enable the sealing of the enclosure 101 to the fixed scroll carrier plate 105.

The operation of the compressor requires energy and other motor controls that require an electrical connection to a motor controller. Provided on the enclosure 101 is a hermetic wire feedthrough 110 that allows for wiring of the compressor.

Figure 3A:
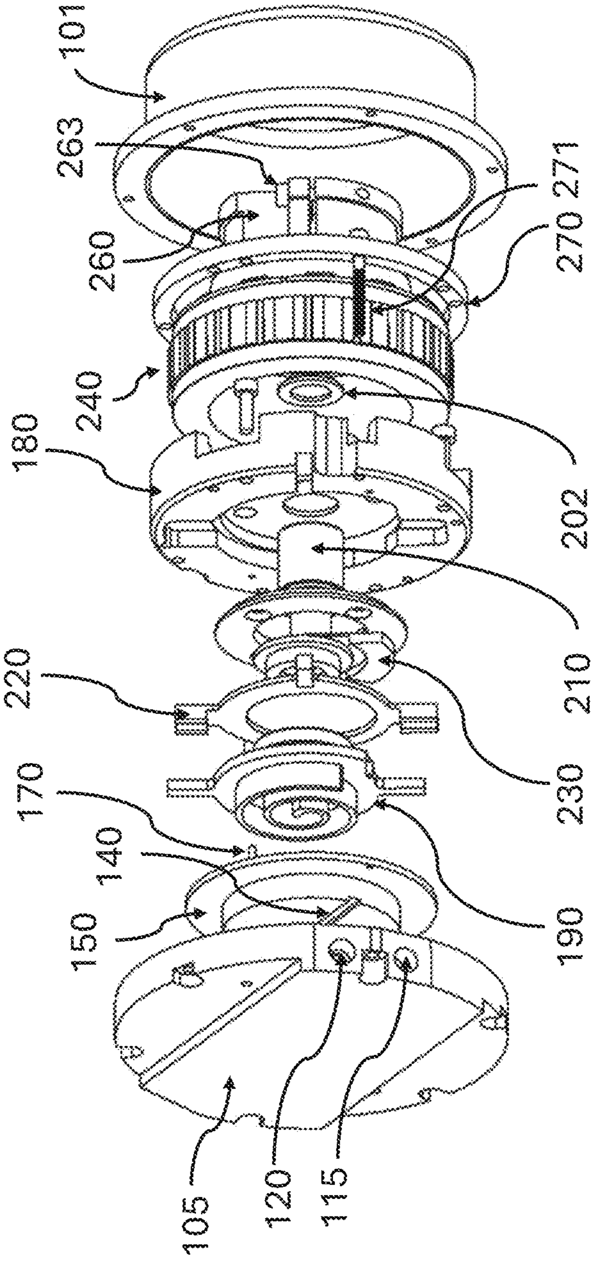
FIG. 3A is a right-side exploded view of the compressor in accordance with the invention.
Figure 4A:
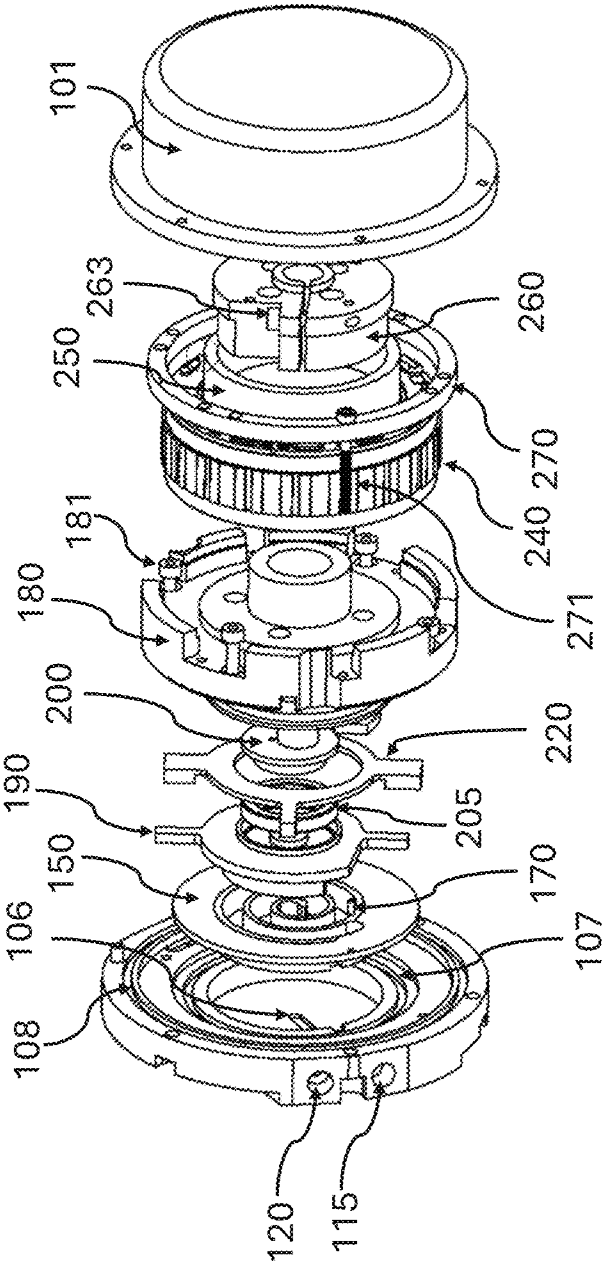
FIG. 4A is left-side exploded view of the compressor in accordance with the invention.

FIG. 3A and FIG. 4A are right and left perspective exploded view assembly drawings, respectively. A low pressure inlet orifice 115 and high pressure outlet orifice 120 are machined into the fixed scroll carrier plate 105. These orifices can be in common threaded connections or stubbed out in a naked material that could be connected to feed tubing via a braze type connection.

As shown in FIG. 4A, the fixed scroll carrier plate 105 has a high pressure outlet channel 106. This channel provides for the flow path of high pressure gas or refrigerant to the high pressure outlet orifice 120. The high pressure outlet channel 106 has a corresponding feature with the fixed scroll high pressure outlet channel 140 that is machined into a fixed or stationary scroll 150. The fixed or stationary scroll 150 is sealed to the fixed scroll carrier plate 105 via the O-ring. The fixed scroll carrier plate 105 has a fixed scroll O-ring groove 107 to accommodate this sealing function. The fixed or stationary scroll 150 nests into the fixed scroll carrier plate 105. The fixed or stationary scroll 150 is located to the fixed scroll carrier plate via a fixed scroll locating pin 170.

With reference to FIGS. 1, 3A and 4A, an upper scroll carrier 180 serves multiple functions in the inventive compressor. This upper scroll carrier 180 is bolted to the fixed scroll carrier plate 105 via scroll carrier bolts 181. The upper scroll carrier 180 contains features that support the nutation of the orbit scroll 190. The orbit scroll 190 nests into the fixed or stationary scroll 150 where the nutation motion of the orbit scroll 190 relative to the fixed or stationary scroll 150 creates the high pressure per the common function of scroll compression. The nutation motion of the orbit scroll 190 is driven by an off-set end feature of a scroll axis center shaft 200. The scroll axis center shaft 200 is centered in the upper scroll carrier 180 and is allowed to rotate with precision by the use of an upper bearing 210 (see FIG. 3A) and a lower bearing 205 (see FIG. 4A). In order to ensure the stack up of tolerance in the scroll axis center shaft 200 fit accurately, a scroll axis center shaft shim 202 is placed between the upper bearing 210 and the rotor mount 260.

The nutation of the orbit scroll 190 is controlled by the use of an Oldham coupling 220. The Oldham coupling 220 has a set of female control surfaces that engage with the orbit scroll 190 and a set of male control surfaces that engage with the upper scroll carrier 180. By engaging both the orbit scroll 190 and the upper scroll carrier 180, the Oldham coupling 220 ensures the precise nutation of the orbit scroll 190 as it is bound by the precision rotation of the scroll axis center shaft 200.

To ensure an appropriate force that will push the orbit scroll 190 into the fixed or stationary scroll 150 so as to contain high pressure gas or refrigeration, a wave washer 225 is inserted above the counter balance 230 and below the upper scroll carrier 180. This wave washer 225 applies a constant force to the scroll axis center shaft 200, which in turn applies a constant force to the orbit scroll 190 thereby pushing the orbit scroll 190 into the fixed or stationary scroll 150. This constant force is critical to maintain pressure during operation.

The wave washer 225 also serves as a pressure relief function of the apparatus. It is known that liquid or other non gaseous substance can sometimes inject into scrolls during operation. It is important that the scrolls are allowed to separate in this event to allow the liquid to escape the scrolls and discharge out the high pressure outlet orifice 120. The wave washer 225 is compliant enough to flatten out during such an event. This will allow the orbit scroll 190 to lift and separate from the fixed or stationary scroll 150 and relieve pressure in the scrolls.

It is known that scroll pumps are out of balance due to the nutation motion of the orbit scroll 190. In order to constrain this out of balance condition, a counter balance 230 is attached to the scroll axis center shaft 200. The counter balance 230 is oriented with a weighted outer region opposite the outer region of the orbit scroll 190 such that, during rotation and nutation, the two components counter the opposing forces to ensure smooth operation.

As shown in FIG. 1A the frameless motor must be mounted such that the stator 240 and the rotor 250 are secured in a precise alignment such that the frameless motor can spin. To accomplish this, the rotor mount 260 must be secured to the rotor 250 and to the scroll axis center shaft 200. The rotor mount 260 is secured to the rotor 250 with the rotor mount clamp 265.

As shown in FIG. 1A, the scroll axis center shaft 200 must be secure to the rotor mount 260. This is accomplished by tightening the rotor mount bolt 263 (see FIG. 4A). When the rotor mount bolt 263 is tightened, the rotor mount 260 compresses on to the scroll axis center shaft 200 and establishes a secure fit.

As shown in FIG. 4A, the stator clamp ring 270 is secured to the scroll carrier 180 with the stator clamp ring bolts 271. Once the stator clamp ring 270 is secured, the stator 240 will be mechanically attached scroll carrier and will be fixed in position. The scroll carrier 180 also secures the rotor 250 that is secured to the scroll axis center shaft 200. As a result, the rotor 250 can spin freely inside the stator 240 with precision.

By placing the scroll pump hardware/mechanism within a frameless motor, i.e., inside the rotor, the compressor can be advantageously manufactured in a flat, hockey puck shape. The inventive compressor is sized to fit in a 1U server. However, the inventive compressor is not limited to this size and can be various sizes depending on requirements. Moreover, the structure of the inventive compressor provides a torque advantage over solid shaft motors. In addition, the wave washer advantageously serves as a pressure relief valve for the nutating and stationary scrolls. That is, if obstructing debris or a foreign object becomes stuck inside, the nutating and stationary scrolls can advantageously separate due to the deflection of the wave washer.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A motor scroll compressor comprising:
- an enclosure;
- a rotor and stator arranged within an interior of the enclosure, the stator being mounted to secure the stator via an upper scroll carrier and a stator clamp ring with an alignment to ensure the motor scroll compressor is rotatable;
- a rotor mount secured to the rotor and a scroll axis center shaft, the rotor mount being secured to the rotor via a rotor mount clamp, and the scroll axis center shaft being secured to the rotor mount via a rotor mount bolt;
- a scroll compressor assembly arranged within the interior of the enclosure, the scroll compressor assembly comprising:
  - a fixed scroll; and
  - an orbit scroll nested within the fixed scroll;
  - a wave washer; and
- a fixed scroll carrier plate attached to the fixed scroll, orbit scroll including an Oldham coupling;
- wherein the rotor mount compresses onto the scroll center shaft to establish a secure fit when the rotor mount bolt is tightened.

2. The motor scroll compressor of claim 1, wherein the upper scroll carrier is bolted to the fixed scroll carrier plate via scroll carrier bolts.

3. The motor scroll compressor of claim 2, wherein the scroll axis center shaft is centered in the upper scroll carrier.

4. The motor scroll compressor of claim 1, wherein the orbit scroll oscillates relative to the fixed scroll to define a volume between the orbit scroll and the fixed scroll, the volume continually decreasing during nutation of the orbit scroll.

5. The motor scroll compressor of claim 2, wherein the Oldham coupling engages both the orbit scroll and the upper scroll to constrain the orbit scroll against rotation while permitting nutation of the orbit scroll driven by rotation of the scroll axis center shaft.

6. The motor scroll compressor of claim 1, wherein the wave washer is located below the upper scroll carrier, the wave washer applying a constant force to the scroll axis center shaft which applies the constant force to the orbit scroll to push the orbit scroll into the fixed scroll.

7. The motor scroll compressor of claim 1, wherein the enclosure and the fixed scroll carrier plate are sealed to each other via an O-ring.

8. The motor scroll compressor of claim 7, wherein the fixed scroll carrier plate includes an O-ring groove to enable sealing of the enclosure to the fixed scroll carrier plate via the O-ring.

9. The motor scroll compressor of claim 1, wherein the enclosure includes a hermetic wire feedthrough for wiring.

10. The motor scroll compressor of claim 1, wherein the fixed scroll carrier plate includes a low pressure inlet orifice and a high pressure outlet orifice.

11. The motor scroll compressor of claim 10, wherein the fixed scroll carrier plate includes a high pressure outlet channel which provides a flow path for high pressure gas or refrigerant to the high pressure outlet orifice.

12. The motor scroll compressor of claim 1, wherein the orbit scroll, when nutating, separates from the fixed scroll to allow foreign matter to pass through the motor scroll compressor when the wave washer is compressed; wherein the wave washer forms a pressure relief valve between the orbit scroll and fixed scroll; and wherein the orbit scroll and fixed scroll separate due to deflection of the wave washer when the foreign matter becomes stuck.

13. The motor scroll compressor of claim 2, wherein the upper scroll carrier supports nutation of the orbit scroll, wherein the orbit scroll nests into the fixed scroll; and wherein nutation motion of the orbit scroll relative to the stationary scroll creates a high-pressure fluid region during operation of scroll compression.

14. The motor scroll compressor of claim 13, wherein the wave washer is positioned above a counter balance and below the upper scroll carrier to provide a force which biases the orbit scroll toward the fixed scroll; and wherein the force maintains compression pressure during operation.

15. The motor scroll compressor of claim 14, wherein the wave washer applies a constant force to the scroll axis center shaft, which in turn applies a further constant force to the orbit scroll such that the orbit scroll is pushed into the fixed scroll.

16. The motor scroll compressor of claim 15, wherein the wave washer provides a pressure relief function; and wherein fluid pressure increases within the scroll compressor until the wave washer deflects to allow the orbit scroll to lift and separate from the stationary scroll to relieve the fluid pressure.

17. The motor scroll compressor of claim 1, wherein the stator clamp ring is secured to the fixed scroll carrier with stator clamp ring bolts; wherein once the stator clamp ring is secured the stator is mechanically attached to the fixed scroll carrier and is fixed in position; and wherein the scroll carrier also secures the rotor which is secured to the scroll axis center shaft.

18. The motor scroll compressor of claim 1, wherein the rotor mount is secured to the rotor at an inner diameter surface of the rotor by contact engagement between the rotor mount and the rotor.

* * * * *